United States Patent [19]

Chapin et al.

[11] Patent Number: 4,849,579
[45] Date of Patent: Jul. 18, 1989

[54] ARTICLES COMPRISING A MINERAL-OIL-FREE ENCAPSULANT

[75] Inventors: John T. Chapin, Alpharetta; Raffaele A. Sabia, Atlanta, both of Ga.

[73] Assignee: American Telephone and Telegraph Company, AT&T Bell laboratories, Murray Hill, N.J.

[21] Appl. No.: 117,919

[22] Filed: Nov. 6, 1987

Related U.S. Application Data

[63] Continuation of Ser. No. 924,123, Oct. 30, 1986, abandoned, which is a continuation of Ser. No. 728,465, May 1, 1985, abandoned, which is a continuation-in-part of Ser. No. 621,083, Jun. 15, 1984, abandoned.

[51] Int. Cl.$^4$ ..................... H02G 15/04; H02G 15/08
[52] U.S. Cl. ............................. 174/74 R; 174/23 C; 174/84 R; 428/375; 428/379; 428/383
[58] Field of Search ..................... 428/375, 379, 383; 174/23 C, 23 R, 84 R, 88 C, 88 R, 76, 75 C; 156/49

[56] References Cited

U.S. PATENT DOCUMENTS

| Re. 30,321 | 7/1980 | Brauer et al. | 260/18 |
|---|---|---|---|
| 3,338,861 | 8/1967 | Mastin et al. | 260/33.6 |
| 3,427,393 | 2/1969 | Masterson | 174/76 X |
| 3,499,972 | 3/1970 | Smith | 174/76 |
| 3,523,607 | 8/1970 | Gillemot et al. | 174/76 X |
| 3,733,426 | 5/1973 | Kaufman et al. | 174/23 C |
| 3,955,043 | 5/1976 | Palmer et al. | 174/84 R |
| 4,025,717 | 5/1977 | Whittingham | 174/84 R |
| 4,029,626 | 6/1977 | Gillemot et al. | 260/31.6 |
| 4,168,258 | 9/1979 | Brauer et al. | |
| 4,329,442 | 5/1982 | Pokorny | 528/49 |
| 4,355,130 | 10/1982 | Heinze | 524/491 |
| 4,466,843 | 8/1984 | Shimirak | 156/49 X |
| 4,503,283 | 3/1985 | Hancock et al. | 174/76 X |
| 4,666,968 | 5/1987 | Downey et al. | 524/296 |

FOREIGN PATENT DOCUMENTS

1335047  10/1973  United Kingdom ................. 174/76

OTHER PUBLICATIONS

*The Condensed Chemical Dictionary*, 10th Edition, Van Nostrand Reinhold Company, 1981 (Title Page).
*The Technology of Plasticizers*, by J. K. Sears and J. R. Darby, pp. 893–915.
3M Company, *New Product Bulletin No. 4*, (4 Pages).

*Primary Examiner*—Lorraine T. Kendell
*Attorney, Agent, or Firm*—Eugen E. Pacher

[57] ABSTRACT

A mineral oil-free cured cable splice encapsulant comprises between about 20% and about 60% polyurethane, by weight of the cured encapsulant, the balance comprising diluent(s) and/or plasticizers, and typically has a cure and typically has a cure time of at least 50 minutes at 25° C. The relatively long cure time, together with other properties of the material, including a viscosity typically between 150 and 1500 centipose, and relatively good "bonding" to plastic-insulated conductors, results in improved water-intrusion resistance of splices enveloped in the novel encapsulant.

15 Claims, No Drawings

ARTICLES COMPRISING A MINERAL-OIL-FREE ENCAPSULANT

This application is a continuation of application Ser. No. 924,123, filed on Oct. 30, 1986, now abandoned, which is a continuation of application Ser. No. 728,465, filed May 1, 1985, now abandoned, which is a continuation-in-part of application Ser. No. 621,083, filed June 15, 1984, now abandoned.

FIELD OF THE INVENTION

This invention relates in general to compounds for protecting matter from hostile ambients by encapsulating the matter, and to matter so encapsulated. In an important specific application, this invention relates to encapsulating compounds for cable splices. Still more specifically, it relates to encapsulating compounds for splices in multiconductor telecommunications cables, e.g., telephone cables.

BACKGROUND OF THE INVENTION

The need to protect an article, or a part thereof, from a hostile environment exists in many areas of technology and commerce. For instance, it is often necessary to protect electrical equipment or components against contact with water or moisture. A particular example of this is the need to so protect joints or splices between electrical conductors, e.g., splice points between multiconductor communications cables.

A frequently used technique for protecting such splice points comprises providing an enclosure around the completed splice, and introducing a curable or gelable liquid into the enclosure. The liquid should ideally fill all the voids between the conductors and other splice components and form closely adhering interfaces with all the surfaces it contacts within the enclosure, thereby reducing the possibility of water migration along such interfaces, which can result in water contact with conductors or other sensitive splice components.

An encapsulating compound for cable splices and the like should ideally also have other desirable characteristics, such as compatibility with all the Prior art encapsulants, which often have initial mixed viscosity in the order of 300–1500 cps (centipoise) at room temperature, tend to have rapidly increasing viscosities, due to their short cure time. This sometimes results in poor penetration of encapsulant into the splice bundle.

The prior art knows compounds, useful in rehabiliation of water-logged cable, that have very low initial mixed viscosity (e.g., about 100 cps at 35° F., about 10 cps at room temperature) and long cure time. See, for instance, U.S. Pat. No. 3,733,426. Such compounds typically are not useful as splice encapsulants, due to their tendency to stress crack polycarbonate.

Although widely used, prior art cable splice encapsulation systems do not provide fully satisfactory protection against water intrusion into the splice work, and the resulting damage and deterioration of service. As a consequence, there exists a need for a splice system that retains the important advantages of prior art systems while, at the same time, being capable of giving improved protection against water intrusion. This application discloses encapsulants having novel properties that result in improved water intrusion resistance. U.S. patent application J. F. Mullin and W. C. Reed Case 5-3, co-assigned with this, and incorporated herein by reference, discloses a forced encapsulation system in which the instant encapsulant can be advantageously used.

GLOSSARY OF TERMS

A "cable" herein is an article comprising a multiplicity of elongated bodies, typically metallic bodies (conductors) but including also dielectric bodies of the type used as optical fibers, and further comprising a dielectric sheath surrounding the elongated bodies. It is to be understood that cables typically also comprise other constituents, such as coatings or materials it contacts, chemical stability over a wide range of operating temperatures, good electrical properties, be reenterable, nonsagging at high temperatures, retain acceptable mechanical properties at low temperatures, be nontoxic to personnel in both the liquid and the cured state, and be acceptable under applicable environmental laws.

Although no prior art encapsulating compound fully possesses all these desirable characteristics, splice encapsulants are in widespread use, in particular, in the telephone industry.

Among the currently most frequently used encapsulant are polyurethane-based material compositions, especially mineral oil extended compositions. For instance, U.S. Pat. No. 4,168,258, issued Sept. 19, 1979 to M. Brauer et al, discloses a cured, cross-linked grease-compatible polyurethane-based material comprising mineral oil and a coupling agent, useful for sealing an insulated electrical device. See also U.S. Pat. Re. No. 30,321.

Similarly, U.S. Pat. No. 4,329,442, issued May 11, 1982 to R. J. Pokorny, discloses a polyurethane prepared from an aliphatic or cycloaliphatic isocyanate, a polydiol, a tri- or tetra-functional aliphatic polyol, a monofunctional aliphatic alcohol, and a catalyst, the composition being useful as an encapsulating compound, said to have good adhesion to greasy insulation material.

Prior art encapsulants, especially cable splice encapsulants, generally are formulated to have relatively short cure (gel) times. For instance, an encapsulant that has recently become available commercially is said to have a gel time of 20 minutes at 23° C., and a gel time at −18° C. of only 35 minutes. The art considers short gel time to be advantageous, since it reduces the time required to complete a splice, and allows speedy job completion. insulation around the individual fibers or conductors, strength members, metallic shielding, and filling material. Examples of cables according to the definition are multiconductor communication cables, e.g., telephone cables, and so-called distribution wire and service wire used in telephone systems. Further examples are coaxial cables of the type used in CATV systems, power cables, including cable containing power distribution wire or service wire, and optical fiber transmission or distribution cable. Cable containing service wire typically is used to connect a customer to a distribution system, and cable containing distribution wire is typically used to branch a higher-capacity cable. Cable according to the definition can be adapted to be below ground by direct burial or in buried conduit, or to be maintained above ground.

By "curing" or "gelling" of the encapsulant is meant herein a linking process, including crosslinking, resulting in a substantial increase of the viscosity of the encapsulant.

The "cure time" or "gel time" at a given temperature herein is the time required for the viscosity of encapsulant at the temperature to increase from the initial value (typically the value immediately after mixing together all the components) to about $10^5$ cps. All cure times herein are understood to be ±15 minutes, unless stated differently.

A "prepolymer" is an adduct or reaction intermediate of a polyol and a monomeric isocyanate, in which either component can be in considerable excess of the other.

Unless defined differently herein, all terms herein are intended to have their customary meaning, as defined, for instance, in *The Condensed Chemical Dictionary*, 10th edition, Van Nostrand Reinhold Company, New York.

SUMMARY OF THE INVENTION

As discussed above, the prior art teaches that encapsulants of the type used to protect cable splices desirably have a short curing time. We, on the other hand, have found that increased protection of splices against water damage can be obtained with encapsulants having relatively long cure time. Although the inventive encapsulant can be used in prior art splicing systems, it is advantageously used in a forced encapsulation system of the type taught by the above referred to patent application Mullin-Reed Case 5-3.

The increased cure time results in more thorough filling of voids and interstices within the splice enclosure (e.g., the elastomer bag of the forced encapsulation system) and the cable ends, leading to improved resistance of the splice system to water intrusion and the thereby caused electrical problems.

The correctness of this novel approach is verified by means of a water intrusion test, to be described later. In this test, splices encapsulated with a prior art encapsulant that is widely used in the telephone industry, having a cure time at 70° F. of 30 minutes, typically failed after about 1–3 days with a 5 ft. water head (cable filled with an oil-extended thermoplastic rubber). In the same test, similar splices encapsulated with the same, but uncatalyzed, encapsulant (cure time at 70° F. about 20–24 hours) typically failed after about 17 days with a 5 ft. head. The improvement in this case clearly is dramatic. Other advantages of the inventive encapsulant will be discussed below.

In a broad sense the inventive composition of matter is a curable material comprising at least one isocyanate, at least one polyol, at least one ester plasticizer, and, optionally, one or more diluents, the material having a cure time of at least about 50 minutes at 25° C. The invention also comprises the above composition of matter, in combination with matter comprising a splice between at least two cables, the splice enveloped in the encapsulant, and the composition of matter, in combination with matter comprising at least one cable, such as in end caps and cable stubs.

The encapsulant is advantageously used by mixing, at the splice site, the previously prepared components of a two- (or multi-) component preparation, pouring the encapsulant into a splice enclosure, where it cures in situ.

As is well known, polyurethane is produced by the condensation reaction of an isocyanate and a hydroxyl-containing material such as a polyol. We have found that the total amounts of isocyanate and of polyol in the uncured encapsulant advantageously are such that the cured encapsulant comprises between about 20% and about 60% polyurethane, preferably between about 30% and 50%, by weight of the cured encapsulant, and the balance comprising diluent(s) and/or plasticizers. All compositional percentages herein are intended to be weight percent of the cured encapsulant, unless stated otherwise. The weight fraction of polyurethane is typically chosen to result in a cured encapsulant having appropriate characteristics, including relatively low tear strength, relatively high pull-out strength, good resistance to water intrusion, and compatibility with cable filling compounds and splice components.

Both aliphatic and aromatic isocyanates are useful in the practice of the invention. The average number of —NCO radicals advantageously is from about 1.2 to about 1.0 per hydroxyl radical. Diluents, of the type to be discussed below, can be added to the isocyanate component as well as to the polyol component, to adjust the mix ratio, and possibly for other reasons.

A variety of hydroxyl-terminated materials can be used to practice the invention, including Castor Oil, polyether and polyester polyols, and hydroxyl-terminated polybutadiene (HTPBD). Criteria for selection include low water absorption, hydrolytic stability, and reactivity. A currently preferred polyol is a HTPBD.

The inventive encapsulant can also comprise one or more substantially unreactive components (diluents), as well as, typically, an ester (or combination of esters) plasticizer. A variety of esters can be employed in the practice of the invention, including esters based on phthalic acid and trimellitic acid, as well as esters of adipic acid and similar diacids.

As is well known, esters can cause stress cracking of polycarbonates, a material frequently present in cable splices (e.g., in connectors). The likelihood of stress cracking decreases with increasing molecular weight, and therefore viscosity, of the ester. On the other hand, the viscosity of the ester should be relatively low, in order to achieve a relatively low-viscosity encapsulant. We have found that esters having viscosity between about 50 and about 500 cps (at 25° C.) can be advantageously used in the inventive encapsulant.

The weight fraction of esters typically is between about 25% and about 70%, preferably between about 35% and 60%. The amount advantageously present depends, inter alia, on the stress cracking potential, the viscosity and the hydrolytic stability of the ester, and the desired dry heat aging characteristics of the encapsulant.

Encapsulant according to the invention may also comprise hydrocarbon oil, typically less than 35%, preferably less than 15%. Some preferred compositions are substantially free of hydrocarbon oils. The hydrocarbon oils useful in the practice of the invention comprise saturated synthetic oils, unsaturated oils, as well as mineral oils.

Mineral oils herein are those aliphatic, cycloaliphatic and branched aliphatic saturated hydrocarbons that contain about 15–20 carbon atoms and are distilled from petroleum. Included are naphthenic as well as paraffinic oil, with naphthenic oils being preferred. Also included are the above oils having a substantial proportion (typically about 5–25% b.w. of the oil) of aromatic molecules. Aromatic oils generally are compatible with polyol and are typically inexpensive diluents, but tend to be volatile and toxic, and can result in stress cracking of polycarbonate.

Saturated synthetic oils, e.g., olefins of the type disclosed in U.S. Pat. No. 4,355,130, and U.S. Pat. No. 3,338,861, can be used in the inventive encapsulant. These oils typically are inexpensive diluents that can reduce the likelihood of stress cracking of polycarbonate. Although use of the above mineral and synthetic oils may be advantageous for cost reasons, the amount added typically should be minimized, in order to get improved encapsulation performance.

Another type of synthetic oils, the unsaturated oils, also referred to as liquid rubbers, e.g., unsubstituted polybutadiene or polyisoprene, or depolymerized natural rubber, are also contemplated as diluents.

An important aspect of the inventive material being its relatively long cure time, the amount of catalyst present is of significance. A widely used catalyst, dibutyl tin dilaurate, has been found to be useful in the practice of the invention. Other known initiators, such as organophosphorous and organoarsenic compounds, are also contemplated. Use of a catalyst is optional, depending, inter alia, on the desired cure time. We have found that catalyst-free encapsulants according to the invention, which may, dependent on the amount and type of polyol present, require up to 20 hours and more to cure at room temperature, can form highly water-resistant seals, and such compositions are among the currently preferred ones.

Since long gel times are desirable in material according to the invention, it is in principle not necessary to prepare a prepolymer of the isocyanate component. However, for health and safety considerations, some prereaction may be desirable.

A further aspect of the invention is the typically relatively low mixed initial viscosity of the encapsulant, typically between about 150 cps and about 1500 cps at 25° C. In some preferred compositions this viscosity is about 400-900 cps. This relatively low viscosity contributes to thorough penetration of the splice work, and often to some penetration into the cable ends, resulting in good water-intrusion-resistance of the encapsulation.

DETAILED DESCRIPTION

A significant aspect of the invention is the discovery that the water-intrusion resistance of encapsulated splices typically can be improved by using a liquid encapsulant having relatively long (longer than about 50 minutes at 25° C.) curing time, while maintaining (or improving upon) the other relevant material properties of the encapsulant. These other properties include initial mixed viscosity, low tear strength and compatibility with all materials present in the splice, including, possibly, preexisting encapsulant in reentered splices. Some relevant aspects of compatibility are: absence of stress cracking, absence of gross materials changes at interfaces (e.g., formation of "oily" interfaces, tackifying of polymeric surfaces), and relatively high pull-out strength of encapsulated (plastic insulated) conductors precoated with cable filling compound.

Compositions according to the invention are advantageously prepared on site by mixing of two separate previously prepared materials, although all the individual components could be mixed together on site, if so desired.

Typically, although not necessarily, one of the previously prepared materials comprises an isocyanate-terminated prepolymer. The prepolymer can be formed by known methods (see, for instance, U.S. Pat. Re. No. 30,321, incorporated herein by reference) from aliphatic or aromatic isocyanates, or from appropriate derivatives. Aliphatic isocyanates useful in the practice of the invention include hexamethylene diisocyanate (HMDI), isophorone diisocyanate (IPDI), 3-isocyanatemethyl, and 3, 5, 5 trimethylcyclohexyl isocyanate. Such aromatic isocyanates include 4,4'-diphenylmethane diisocyanate (MDI), and 2,4-tolylene diisocyanate (TDI). Appropriate derivatives of isocyanates include a polymethylene phenyl isocyanate available from Upjohn Company, LaPorte, Tex., under the trade name PAPI 94, and a polymethylene polyphenyl isocyanate available from Mobay Chemical Corporation, Pittsburgh, Pa., under the trade name MONDUR MRS-10. In general, the derivatives comprise aromatic and aliphatic isocyanates substituted with other organic and inorganic groups that do not adversely affect the course of the chain-extending and/or cross-linking reaction. Isocyanates useful in the practice of the invention typically have relatively low average "functionality", between about 2 and about 2.5.

An isocyanate-terminated prepolymer can be prepared by reacting an excess of an appropriate isocyanate with one or more polyols, typically polyol of molecular weight between about 1000 and about 6000. Among the polyols useful in the practice of the invention are those selected from compounds based essentially on HTPBD, hydroxyl-bearing ethers and/or esters, Castor Oil, or combinations thereof. Polyols of the same type can also be used in the second part of a two-part preparation, also referred to herein as the polyol part. Other desirable polyols are hydroxyl-terminated polyisoprene, and combinations of butadiene and/or isoprene with other monomers, such as styrene.

Criteria for selection of polyols comprise low water absorption and appropriate reactivity of the polyol, as well as good hydrolytic stability and flexibility of the encapsulant formed therewith. The currently preferred polyols belong to a family of liquid, hydroxyl terminates polymers of butadiene with a number average molecular weight of about 3000, and degree of polymerization typically in the range of 50, available from ARCO Chemical Company, Philadelphia, Pa., under the trade name POLY BD. As is stated in previously referred to (and incorporated herein) U.S. Pat. Re. No. 30,321, POLY BD has an equivalent weight of approximately 1260.

Polyether and/or polyester polyols are used to reduce the viscosity and to reduce the reactivity. For instance, use of polyols having secondary or tertiary hydroxyls, e.g., polyether diols and triols, reduces the rate of reaction, and delays onset of gelation, relative to a similar system using primary hydroxyl polyols. On the other hand, use of higher molecular weight polyol typically results in higher viscosity of the mixed encapsulant.

Exemplary polyether polyols are propylene oxide adducts of diol starters, propylene oxide adducts of triol starters, ethylene oxide adducts of polyoxypropylene diols, and ethylene oxide adducts of polyoxypropylene triols, all available under the trade name Niax Polyols. Other exemplary polyether polyols are available from DuPont, Wilmington, De., under the trade name Teracol. These latter substances are polytetramethylene ether glycols.

Castor Oil is one of the polyols known to the prior art. Although it is advantageously used in prepolymer formation, its exclusive use in the polyol part is currently not preferred. An exemplary Castor Oil is a substance consisting substantially of triglyceride of ricinoleic acid, available from CasChem Corporation, Bayonne, N.J. under the trade name DB OIL. This polyol has an equivalent weight of about 342.

It will be understood that, in general, the liquid encapsulant, or its precursor materials, has to comprise enough isocyanate(s) and polyol(s) to result in a 20-60% b.w. polyurethane content of the cured encapsulant, with the balance being diluents, plasticizers, catalyst, fungicides, antioxidants, or other property-modifying additives. Various ways of achieving this end are possible and known to those skilled in the art, and all these are intended to be within the scope of the invention.

The polyol part of a two-part encapsulant preparation according to the invention typically comprises, in addition to polyol or polyols, one or more nonreacting esters (a plasticizer), and, optionally, saturated synthetic oils, unsaturated oils, and/or mineral oils, in addition to such optional additives as catalysts.

Exemplary esters are listed, for instance, in *Technology of Plasticizers,* J. K. Sears and J. R. Darby, J. Wiley and Sons, 1982, and include phthalates, trimellitates, high molecular weight adipates, azelates, and succinates, and similar esters which meet the criterion of low stress-cracking activity on polycarbonates. Specific examples are 6-10 trimellitates, available from USS Chemical, Pittsburgh, Pa., under the trade name PX-336, and ditridecyl phthalates, available from Exxon Corporation, Houston, Tex. Esters typically are about 25-70%, preferably 30-60%, of the encapsulant.

In material according to the invention, the proportion of hydrocarbon oils is preferably relatively low, typically less than 35%. Reducing the amount of hydrocarbon from the relatively high amounts present in prior art encapsulants results typically in increased water intrusion resistance by the encapsulant. Mineral oils useful in the practice of the invention are naphthenic as well as paraffinic oils, with the former generally preferred, since they are generally more compatible with HTPBD, and generally have lower pour point than the latter. The naphthenic oil content of the mineral oil is desirably greater than 25%, as determined by carbon type analysis, and desirably have an aromatic content less than 15% by weight of the oil, as determined by clay gel analysis. Desirably, the pour point is less than about +15° F., and the SUS viscosity is between about 200 and about 400. Such mineral oils are available, for instance, from Sun Oil Corporation, Marcus Hook, Pa. (e.g., under the trade name Sunpar LW 120), and from Penreco, Butler, Pa. (e.g., under the trade name Drakeol 35). Synthetic oils typically are added at about the 5% b.w. level because of their generally relatively high viscosity.

Oils such as polyisoprenes, depolymerized material rubbers, or polybutadienes are typically compatible with HTPBD and thus may be used to replace in part nonreactive esters. This substitution was found to result in improved water resistance of at least some encapsulants. A preferred synthetic oil is polyisoprene, available from Hardman, Incorporated, Belleville, N.J., under the trade name Isolene XL, having a viscosity of 20,000 cps at 72° F. An exemplary butadiene is available from Colorado Chemical Specialties, Inc., Golden, Col., under the trade name Ricon 157, having viscosity of 700 cps at 25° C.

In general, hydrocarbon oils of the type discussed here are mixtures of various molecular weight oils, including, generally, aromatic as well as naphtinic and paraffinic oils. Aromatic oils are available from Kendrich Oil of Bayonne, N.J. (e.g., under the trade name Kemplast G). Such oils typically cannot be used undiluted because of their tendency to stress crack polycarbonate, as well as their toxicity. For similar reasons, the aromatic content of naphtinic and paraffinic oils should be relatively low, typically no more than about 15% b.w. of the oil (by clay gel analysis). Drakeol 35 is substantially aromatic-free.

Catalysts for curing polyurethanes are well known and include dibutyl tin dilaurate, available under the designation T-12 from M&T Chemicals, Inc., of Rahway, N.J. The amount of catalyst is to be adjusted to result in the desired gel time, no less than about 50 minutes at 25° C. The exact amount typically depends on the details of the composition and the desired objective, and its determination may require a minor amount of experimentation. A typical level is 0.06% b.w. of the polyol. In an encapsulant comprising about 40% polyurethane, this amount of tin catalyst would result in a cure time of about 60 minutes. It is, of course, possible to practice the invention without use of catalyst. The cure time can be adjusted not only by choice of the amount (or type) of catalyst used, but also by proper selection of the proportion of primary or higher polyols with the presence of higher (secondary or tertiary) polyols resulting in longer cure time. However, it is not only the cure time at 25° C. that is of concern in materials according to the invention, but also the cure times at higher temperatures.

Currently preferred encapsulant compositions comprise less than 10% hydrocarbon oil, more preferably still, are substantially free of such oils. Furthermore, such compositions comprise between about 50% and about 70% of trimellitate. Some of the trimellitate may be present in the prepolymer part. That part further comprises sufficient MDI isocyanate and Castor Oil such that, together with the HTPBD-based polyol in the polyol part, between about 30% and about 50% of the encapsulant formed from the parts, is polyurethane. Furthermore, preferred compositions have gel times greater than 75 minutes at 25° C., with some preferred compositions being substantially catalyst-free.

The ability of various encapsulants to resist water intrusion into a splice was evaluated by means of a test in which a simulated splice, comprising typically 50 pairs of standard 22 AWG plastic insulated conductor, connected by means of a commercially available connector, inserted into a test cell which was then filled with encapsulant, was subjected to water at a controlled pressure, indicated in terms of head of water. The electrical resistance between various combinations of wires (corresponding to ring-ground, tip-ground, and ring-tip in a telephone cable) was monitored, with a drop below $10^9 \Omega$ considered a failure. Increase in time to failure indicates improved ability to resist water inversion. Table I shows exemplary results of some of these tests.

TABLE I

| | Water Intrusion Test | | |
|---|---|---|---|
| line | encapsulant | conductors | water head (feet) | days to failure |
| 1 | D, catalyzed | b | 5 | 134+ |
| 2 | D, catalyzed | a | 5 | 1-3 |
| 3 | D, catalyzed | c | 5 | <1 |
| 4 | D, uncatalyzed | a | 5 | 17 |
| 5 | F, catalyzed | a | 5 | 43 |
| 6 | F, catalyzed, partially reacted | a | 5 | 3 |

TABLE I-continued

Water Intrusion Test

| line | encapsulant | conductors | water head (feet) | days to failure |
|---|---|---|---|---|
| 7 | F-1, catalyzed | a | 5 | 121 |
| 8 | F-1, catalyzed partially reacted | a | 5 | 1 |
| 9 | N-6XL, catalyzed | a | 5 | 59 |
| 10 | C-1, ½ catalyzed | c | 5 | 2 |
| 11 | C-1, uncatalyzed | c | 5 | 35+ |
| 12 | D, catalyzed | b | 8 | <1 |
| 13 | D, uncatalyzed | a | 8 | <3 |
| 14 | F, catalyzed | a | 8 | <5 |
| 15 | F, uncatalyzed | a | 8 | 42+ |
| 16 | F-1, catalyzed | a | 8 | 22 |
| 17 | F-1, uncatalyzed | a | 8 | 69+ |
| 18 | N-6XL, catalyzed | a | 8 | 14 |
| 19 | F-17B, catalyzed | a | 8 | 1 |
| 20 | F-17B, uncatalyzed | a | 8 | 88+ |
| 21 | F-1, uncatalyzed | a | 10 | 69+ |

Key to Table I: for compositions, see Table II:
"catalyzed": gel times 20-40 minutes;
"½ catalyzed": gel time about 65 minutes;
"uncatalyzed": gel times about 20 hours;
(all gel times are at room temperature);
conductors "a": had been in contact with oil extended thermoplastic rubber filling compound;
conductors "b": had not been in contact with any filling compound;
conductors "c": had been in contact with petroleum jelly filling compound;
days to failure: "+" indicates that test is continuing.

TABLE II

Composition of Encapsulants of Table I

| Encapsulant | Polyurethane (%) | Ratio prepolymer/polyol | HTPBD (%) | Polyether polyol[c] (%) | Diluents and Plasticizers (%) | | | |
|---|---|---|---|---|---|---|---|---|
| | | | | | (1) | (2) | (3) | (4) |
| D[a] | 34.9 | 17/83 | 32.5 | — | 25.2 | 42.3 | — | — |
| D[b] | 34.9 | 17/83 | 32.5 | — | 25.2 | 42.3 | — | — |
| F | 49.2 | 21.4/78.6 | 51.1 | — | 17.8 | 31.1 | — | — |
| F-1 | 49.0 | 21.2/78.8 | 49.4 | — | 50.6 | — | — | — |
| N-6XL | 45.7 | 19.7/80.3 | 46.4 | — | 45.5 | — | 8.1 | — |
| C-1 | 40.0 | 17.7/82.3 | 40.2 | — | — | — | — | 59.8 |
| F-17B | 50.0 | 22.9/77.1 | 31.2 | 20.6 | 48.2 | — | — | — |

Notes (i) An isocyanate-terminated Castor-Oil-based polyurethane prepolymer (comprising polymeric MDI, Castor Oil, and dioctyl adipate) available from CasChem, Inc. under the trade name Vorite 715 M-1, was used as the prepolymer part in all compositions listed in Table II.

(ii) The percentage of polyurethane is weight percent of the cured encapsulant, all other percentages are weight percent of the polyol part.

Key to Table II (a) catalyzed: a HTPBD-based polyol, available from CasChem, Inc. under the trade name Polycin 934-M3, was used. The composition of the polyol was established using IR analysis methods.

(b) uncatalyzed: as in (a), except that trade name is Polycin 934-M4

(c) polyether triol Niax LG56
(1) dioctyl adipate
(2) white mineral oil, Drakeol 35
(3) synthetic oil, Isolene XL 20097-3
(4) 6-10 trimellitate Table I shows, inter alia, that typically the water intrusion resistance depends on the presence or absence of a filling compound and, where present, on the type of filling compound. Compare, for instance, lines 1 and 2, and lines 2 and 3, of Table I. Furthermore, the data shows that typically longer cure times, in excess of about 60 minutes, result in improved water intrusion resistance. See, for instance, lines 2 and 4, 10 and 11, 14 and 15, 16 and 17, and 19 and 20. A further point illustrated by the data is the effect of viscosity and very short gel times. See lines 5 and 6, and 7 and 8. The "partially reacted" compounds were held at room temperature for about 10 minutes after mixing, and then poured. This resulted in high initial viscosity of the encapsulant as poured, as well as in reduced subsequent gel time. The observed effect was a significant reduction in the time to failure. The table also illustrates the sensitivity of time to failure to water pressure. See lines 5 and 14, and 17 and 21. A further significant point illustrated by the data is the effect of composition, in particular, of diluent content, on water intrusion resistance. See lines 2 and 5, and 11 and 13. The beneficial effect of mineral oil reduction or elimination is also apparent. See lines 5 and 7, and 14 and 16.

Bonding of encapsulant to insulated conductors is measured by means of a pull-out test. A predetermined length of conductor (4.5 inches) is embedded in encapsulant and pulled out (at a rate of 50 mm/minute) on a standard tensile test machine (Instron). Increase in pull-out force indicates improved adhesion of the encapsulant to the insulation. In order to get results representative of actual conditions, wire removed from actual cables (air core, petroleum jelly filled, and oil-extended thermoplastic-filled) were used. Exemplary results are shown in Table III.

TABLE III

Pull-Out Test

| line | encapsulant | conductors | pull-out load (lb.) |
|---|---|---|---|
| 1 | D, catalyzed | a | 2.4 |
| 2 | D, catalyzed | b | 7.4 |
| 3 | F, uncatalyzed | a | 3.7 |
| 4 | F-1, uncatalyzed | a | 4.4 |
| 5 | C-1, uncatalyzed | a | 10.2 |
| 6 | C-1, uncatalyzed | b | 13.1 |
| 7 | C-1, uncatalyzed | c | 2.5 |
| 8 | C-1, ½ catalyzed | a | 12.6 |
| 9 | C-1, ½ catalyzed | c | 3.0 |

Note:
see keys to Tables I and II for explanation.

The data of Table III shows, inter alia, the effect of insulator contamination on pull-out strength, with clean (unfilled cable) conductors tending to have higher strength. See lines 1 and 2, and 6 and 7. Furthermore, the type of filling compound is shown to be important. See lines 9 and 10. The results also indicate that long cure time does not have a significant effect on the pull-out strength. This suggests that the improved water intrusion resistance of encapsulants according to the invention is due to their low viscosity and long cure time. Desirably, encapsulants according to the invention have pull-out strength (as measured by the above-described test) of at least about 4 lb. for 22 AWG plastic insulated wires whose insulation is treated with oil-extended thermoplastic, and of at least about 2 lb. for such wires whose insulation is treated with petroleum jelly.

Although the preferred application of compositions of matter according to the invention is as cable splice encapsulant, these compositions can typically also be employed for making pressure plugs in cables, preferably in filled telecommunications cables. In this application the invention composition is typically injected under pressure into the cable and allowed to cure in situ. This procedure does typically required no further preparatory steps, and results in pressure plugs that permit splicing of unpressurized cable to pressurized cable. Other possible uses of the inventive composition are as encapsulant in cable end caps, as encapsulant in cable restoration, and as filling compound in cable stubs. End caps are used to protect a cable termination, e.g., the termination of a telephone distribution cable. Plastic insulation is subject to deterioration in some environments, and such cables can be restored by removing the portion containing the cracked insulation, splicing a cable stub to the virgin conductor, and encapsulating the splice. Cable stubs are short lengths of cable that may be attached to equipment such as terminals or repeater housings.

The following examples are intended to further illustrate the practice of the invention, in particular, the synthesis of encapsulants according to the invention.

EXAMPLE 1

A prepolymer was prepared, substantially as described in U.S. Pat. Re. No. 30,321, Example XIII. The reactants and their amounts were also as given in that example. A polyol mixture was prepared by mixing 40.2 parts b.w. hydroxyl-terminated polybutadiene (POLY BD) with 59.8 parts normal alkyl trimellitate (6–10 TM) until homogeneously dispersed, with a resulting viscosity of about 896 cps at 75° F. Mixing 17.7 parts by weight prepolymer with 82.3 parts of polyol mixture (NCO/hydroxyl ratio of about 1.15, in this and all subsequent examples) resulted in encapsulant having a gel time of about 20 hours, relatively low tear strength (2.85 lb/inch width), and good water intrusion resistance (see line 11 of Table I).

EXAMPLE 2

A prepolymer of the same composition as in Example 1 was prepared substantially as in Example 1, except that the prepolymer was prepared at room temperature, without any heating step. The polyol mixture had the same composition as the mixture of Example 1. The encapsulant resulting from mixing of the two components had properties substantial as the material of Example 1.

EXAMPLE 3

A prepolymer is prepared by a procedure substantially as described in U.S. Pat. Re. No. 30,321, Example XIII, except that polymeric MDI is replaced by IPDI, and that the following percentages of materials are used: 25.6% IPDI, 14.9% Castor Oil, and 59.5% dioctyl adipate. All percentages are by weight of prepolymer. A polyol is prepared by mixing 40.2% POLY BD and 59.8% 6–10 trimellitate. Mixing the prepolymer and the polyol results in an encapsulant having a polyurethane content of 40% b.w. and a cure time of about 20 hrs.

For the examples below Vorite 715 M-1 was used. See Notes to Table II.

EXAMPLE 4

A polyol mixture was prepared as in Example 1, and encapsulant formed by mixing 17.7 parts of the commercial prepolymer with 82.3 parts of the polyol mixture. The properties of the resulting encapsulant were substantially the same as those described in Example 1.

EXAMPLE 5

A polyol mixture was prepared by mixing 49.4 parts of HTPBD with 50.6 parts of dioctyl adipate. The viscosity of the resulting material was about 577 cps at 75° F. Mixing 21.2 parts of the commercial prepolymer with 78.8 parts of the polyol mixture resulted in an encapsulant with a gel time of about 20 hours.

EXAMPLE 6

A polyol mixture was prepared as in Example 5, to which 0.0165% of T-12 dibutyl tin dilaurate catalyst was added. Adding 78.8 parts of this mixture to 21.2 parts of the commercial prepolymer yielded encapsulant having a gel time of about 30 minutes at 75° F.

EXAMPLE 7

22.9 parts of the commercial prepolymer is mixed with 77.1 parts of a polyol mixture formed by blending HTPBD with a polyether polyol (NIAX LG56) in a weight ratio 1.86:1 and dioctyl adipate, for a total polyurethane content of the encapsulant of 50% b.w. The polyol mixture had a viscosity of 348 cps at 75° F. The encapsulant had a cure time in excess of 20 hours, and showed good water intrusion resistance. See line 20 of Table I.

What is claimed is:

1. In combination:
   (a) at least a first cable comprising a tubular dielectric sheath enveloping a multiplicity of elongate metal bodies, at least some of the metal bodies extending longitudinally beyond an end of the tubular sheath; and
   (b) a mineral-oil-free cured encapsulant enveloping at least a part of the metal bodies extending beyond the end of the sheath, the encapsulant consisting essentially of
   (i) 20–60% by weight of a polyurethane formed from at least one isocyanate and at least one polyol, with the balance consisting of ester plasticizer; or
   (ii) 20–60% by weight of a polyurethane formed from at least one isocyanate and at least one polyol, with the balance consisting of ester plasticizer and an additive selected from the group consisting of catalysts, fungicides, antioxidants, and mixtures thereof.

2. The combination of claim 1, wherein the encapsulant comprises 25–75% by weight plasticizer.

3. Combination of claim 2 further comprising at least a second cable and a splice between the first and the second cable, the splice enveloped in the encapsulant.

4. Combination of claim 2, wherein the encapsulant has a cure time of at least about 50 minutes at 25° C.

5. Combination of claim 2, wherein the encapsulant is formed by mixing together at least two previously prepared parts, one of the parts comprising an isocyanate prepolymer formed by reacting the isocyanate with a portion of the polyol, and the other of the parts comprising the remainder of the polyol, the uncured encapsulant having a viscosity at completion of mixing of the at least two parts, this viscosity to be referred to as the "initial mixed viscosity", the initial mixed viscosity being between about 150 centipoise (cps) and about 1500 cps at 25° C.

6. Combination of claim 5, wherein the uncured encapsulant has an initial mixed viscosity greater than about 400 cps at 25° C.

7. Combination of claim 2, wherein the encapsulant has a pull-out strength, for plastic-insulated 22 AWG wire coated with oil-extended thermoplastic rubber, of at least about 4 lbs, as determined by embedding a 4.5 inch length of substantially straight wire in a mass of the uncured encapsulant, curing the encapsulant, and pulling the embedded wire from the cured encapsulant at a pull rate of 50 mm/minute.

8. Combination of claim 2, wherein the encapsulant has a pull-out strength, for plastic-insulated 22 AWG wire coated with petroleum jelly, of at least about 2 lbs, as determined by embedding a 4.5 inch length of substantially straight wire in a mass of the uncured encapsulant, curing the encapsulant, and pulling the embedded wire from the cured encapsulant at a pull rate of 50 mm/minute.

9. Combination of claim 2 wherein the ester plasticizer is chosen from the group consisting of trimellitates, phthalates, and combinations thereof.

10. Combination of claim 2, wherein the combination forms part of a cable termination.

11. Combination of claim 2 wherein the combination further comprises a cable stub spliced to the first cable.

12. The combination of claim 2, wherein the at least one isocyanate is selected from the group consisting of diphenylmethane diisocyanate (MDI), polymeric MDI, and derivatives of MDI, and the at least one polyol is selected from the group consisting of hydroxyl-terminated polyisoprene, polyether, and castor oil, and the ester plasticizer has a viscosity of at most 500 cps at 25° C.

13. Combination of claim 2, wherein the encapsulant comprises ester plasticizer chosen from the group consisting of trimellitates, phthalates, azelates, succinates, high molecular weight adipates, and combinations thereof.

14. Combination of claim 12, wherein the encapsulant comprises ester plasticizer chosen from the group consisting of 6-10 trimellitate, ditridecyl phthalate, dioctyl adipate, and combinations thereof.

15. The combination of claim 2, wherein the at least one isocyanate is selected from the group consisting of diphenylmethane diisocyanate (MDI), polymeric MDI, and derivatives of MDI, and wherein the at least one polyol is selected from the group consisting of hydroxyl-terminated polybutadiene, hydroxyl-terminated polyisoprene, polyether, and castor oil, and the ester plasticizer has a viscosity of at most 500 cps at 25° C.

* * * * *